US006510429B1

(12) United States Patent
Todd

(10) Patent No.: US 6,510,429 B1
(45) Date of Patent: Jan. 21, 2003

(54) MESSAGE BROKER APPARATUS, METHOD AND COMPUTER PROGRAM PRODUCT

(75) Inventor: Stephen James Paul Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/165,945

(22) Filed: Oct. 2, 1998

(30) Foreign Application Priority Data

Apr. 29, 1998 (GB) .............................................. 9809020
Jun. 3, 1998 (GB) .............................................. 9811802

(51) Int. Cl.[7] .......................... G06F 17/30; G06F 17/00
(52) U.S. Cl. .......................... 707/10; 707/201; 705/36; 709/314
(58) Field of Search .............................. 707/2, 10, 101, 707/102, 104.1; 709/201, 203, 314, 206, 213–216; 705/35, 36

(56) References Cited

U.S. PATENT DOCUMENTS

| | | | | |
|---|---|---|---|---|
| 5,276,899 A | * | 1/1994 | Neches | 340/825.02 |
| 5,530,939 A | * | 6/1996 | Mansfield et al. | 707/201 |
| 5,649,186 A | * | 7/1997 | Ferguson | 707/10 |
| 5,710,889 A | * | 1/1998 | Clark et al. | 235/379 |
| 5,878,419 A | * | 3/1999 | Carter | 707/10 |
| 5,893,079 A | * | 4/1999 | Cwenar | 705/36 |
| 6,233,575 B1 | * | 5/2001 | Agrawal et al. | 707/6 |

FOREIGN PATENT DOCUMENTS

| | | | | |
|---|---|---|---|---|
| EP | 806 731 | 11/1997 | ......... | G06F/17/30 |
| EP | 959416 | 11/1999 | ......... | G06F/17/30 |

OTHER PUBLICATIONS

Wise et al. "Message Brokers: a Novel Interprocess Communications Primitive", IEEE 1993, pp. 184–193.*

Zimran et al "Performance Analysis of Distributed Client-Server message Queuing", IEEE 1994, pp. 550–555.*

"Integrating the Corporate Computing Environment with Active Software" from http://activesw.com website, pp 1–19, by Dr Rafael Bracho, 1996.

"Secure Business Events on the Internet" from http://openhorizon.com website, pp 1–8, by Mitchell I Kramer, 1997.

"Ambrosia Technical Overview" from http://openhorizon.com website, pp 1–17, by Anne Thomas, Mar. 1997.

"Building Mission —Critical Financial Applications with Ambrosia" from http://openhorizon.com website, pp 1–6, 1997.

(List continued on next page.)

Primary Examiner—Safet Metjahic
Assistant Examiner—Uyen Le
(74) Attorney, Agent, or Firm—A. Bruce Clay

(57) ABSTRACT

A message broker data processing apparatus for receiving messages from a sender application, processing the received messages and deciding which receiver application to forward the processed messages. An incoming stream of messages is received from a sender application, with each message being arranged as a tuple having at least one field. The incoming stream of messages is collated with data stored in a database, the data being also arranged as tuples having at least one field. The stream of message is processed so that a resultant stream of messages becomes directed to at least one receiving application.

39 Claims, 2 Drawing Sheets

OTHER PUBLICATIONS

"Oracle8—The Database for Network Computing—an Oracle Business White Paper" from http://oracle.com website, pp 1–8, Jun. 1997.

"Oracle Advanced Queueing" from http://oracle.com website, p 1, 1995.

"Client Server System for Delivery of On–line Information", abstract only of WO 9745786, Christian Stumm, V–Cast, Inc., 1997.

WO 96/18963 A1 (FS Holdings), see especially fig. 1 and p. 12 lines 6–26.

DBMS vol. 10, No. 10, Sep. 1997, D.S.Linthicum, "Next-generation middleware; multitiered distribution systems and the Web are changing the face of middleware as we know it", pp. 69–74, and also IAC Accession No. 19722422.

"Introducing Access into Intranet" by AOYAMA, Microsoft Access '97, Special Program, Japan, EI–Ai Publication, Inc. pp. 104–111.

* cited by examiner

MESSAGE BROKER APPARATUS, METHOD AND COMPUTER PROGRAM PRODUCT

FIELD OF THE INVENTION

The present invention relates to the field of client/server (also known as "distributed") computing, where, for example, one computing device ("the client") requests another computing device ("the server") to perform part of the client's work.

BACKGROUND OF THE INVENTION

Client/server computing has become more and more important over the past few years in the information technology world. This type of distributed computing allows one process (a "client") running on a machine to delegate some of its work to another process (a "server") running on another machine that might be, for example, better suited to perform that work. The client and server might also be two processes running on the same physical machine.

Message queuing data processing technology has become more and more prevalent in today's client/server computer networks. This technology permits a client computer system to communicate with a server computer system even though these two systems are very different to each other, in terms of operating system, data format and communication protocol. Further, due to the asynchronous nature of this technology, the client can send the server a message and the server can store the message in a queue and process and respond to the message at a later time. This is quite different from the synchronous client/server models which have required the client and server to converse in real time (e.g., the client waits for the server to respond before the client carries on with other tasks).

Message queuing and commercially available message queuing products are described in "*Messaging and Queuing Using the MQI*", B. Blakeley, H. Harris & R. Lewis, McGraw-Hill, 1994, and in the following publications which are available from IBM Corporation: "*An Introduction to Messaging and Queuing*" (IBM Document number GC33-0805-00) and "*MQSeries—Message Queue Interface Technical Reference*" (IBM Document number SC33-0850-01). IBM and MQSeries are trademarks of IBM Corporation. IBM's MQSeries messaging software products provide transactional messaging support, synchronising messages within logical units of work in accordance with a messaging protocol which gives assured once and once-only message delivery even in the event of system or communications failures. MQSeries products provide assured delivery by not finally deleting a message from storage on a sender system until it is confirmed as safely stored by a receiver system, and by use of sophisticated recovery facilities. Prior to commitment of transfer of the message upon confirmation of successful storage, both the deletion of the message from storage at the sender system and insertion into storage at the receiver system are kept 'in doubt' and can be backed out atomically in the event of a failure. This message transmission protocol and the associated transactional concepts and recovery facilities are described in international patent application WO 95/10805 and U.S. patent 5465328, which are incorporated herein by reference.

It is becoming more and more common to combine such a messaging and queuing system with a relational database system, such as IBM's DB2 product or Microsoft's Access product (DB2 is a trademark of IBM Corp. while Access is a trademark of Microsoft Corp.) since relational databases are commonly used as a structured mechanism for storing and retrieving large quantities of related data.

For example, Sun Microsystems, Inc. have described (see European Patent Application No. 806,731, published Nov. 17, 1996) a messaging and queuing system used to carry out a publish/subscribe function. Servers act as publishers and publish messages while specifying a topic for each message. Clients act as subscribers and specify a topic on which they would like to receive messages. A messaging and queuing broker is placed in between the clients and servers and acts to distribute published messages to the appropriate clients. The system allows for a database to be provided as a publishing server so that a large quantity of structured data can be published to the network. The database could also be provided as a subscribing client, storing received published messages for easy and structured retrieval of a large quantity of messages. This system does not describe any further integration between the messaging and queuing system and the relational database system.

Oracle Corporation has taken this integration one step further with their Oracle8 Advanced Queuing (AQ) system ("Oracle8" and "Advanced Queuing" are trademarks of Oracle Corp.) by allowing a client application (subscriber) to submit a structured query to the messaging and queuing broker, in order to specify which published messages the subscriber wants to receive. The ability of a subscriber to use a standard database language, such as SQL (structured query language) to specify a topic of interest allows for a high-level of specificity in terms of expressing exactly what types of published messages the subscriber would like to receive. For example, the subscriber can use standard SQL query statements in order to specify that the subscriber would like to receive all published IBM stock quotes but only if the share price is greater than 100 United States dollars per share. In addition to using SQL statements, the subscriber can also take advantage of the various visual relational database programming techniques such as that provided by the Microsoft Access product in order to make it easier for the programmer to specify exactly what types of published messages the subscriber would like to see.

Open Horizon Corporation have taken this integration one step further still, with their Ambrosia 2.1 product (Ambrosia is a trademark of Open Horizon Corp.), by allowing a messaging and queuing broker to add subject matter to the contents of published messages before forwarding the messages on to requesting subscribers. The messaging and queuing broker receives a published message into an input queue. Like the Oracle product, standard SQL techniques are used to specify exactly which types of published messages a subscriber wants to see. However, the Ambrosia product goes further to collate the information in the published message with records stored in a relational database. Specifically, once a published message is received, some of the data from the database records is then added to the contents of the published message in order to create a published message with a more detailed contents, as compared to the published message that was originally received by the messaging and queuing broker. For example, if a published message specifying that IBM stock is now listing for 125 dollars per share is received at the broker's input queue, the broker could be programmed to retrieve information from a relational database, such information containing the identity of the customer (e.g., C23) and the amount of IBM stock which this customer presently owns (e.g., 225 shares). The retrieved information from the database is then combined with the published information to create a more detailed message that customer C23 owns 225 shares of IBM stock which is currently trading at 125 dollars per share, which is then forwarded to the customer C23 who has previously registered as a subscriber.

While the Ambrosia product provides considerable value over the other products mentioned above, it suffers from the disadvantage that dedicated software code must be written to specify exactly how the published messages will be collated with the database records.

Active Software, Inc.'s ActiveWeb (a trademark of Active Software, Inc.) message broker product is similar to Open Horizon's Ambrosia product in that database content can be added to published messages to add value to the published message. ActiveWeb makes use of a specific piece of software code called a database adapter to perform the collation (e.g., join) operation. This adapter is required in order to extract data from the published messages, convert the data into a database query in the exact form that is expected by the database, retrieve data from the database and carry out the specific collation operation on the published messages and the database data.

Thus, ActiveWeb also shares Ambrosia's disadvantage of the necessity to provide a dedicated piece of software to perform the collation operation which, for example, joins the published messages with the database records. Making modifications to such software requires the user to be familiar with the programming structure and language of the dedicated piece of software. Thus, while a programmer may find it easy to make modifications to the remainder of the message broker, it is necessary to switch to a new programming environment in order to make modifications to the dedicated piece of software that performs the collation operation.

SUMMARY OF THE INVENTION

According to one aspect, the present invention provides a message broker data processing apparatus for use in receiving messages from a sender application, processing the received messages and deciding which receiver application to forward the processed messages, has: a means for receiving an incoming stream of messages from a sender application, with each message being arranged as a tuple having at least one field; a means for collating the incoming stream of messages with database data stored in a database, the database data being also arranged as tuples having at least one field; and a means for processing the stream of messages so that a resultant stream of messages becomes directed to at least one receiving application.

Preferably, the means for receiving, means for collating and means for processing utilize a plurality of processing nodes interconnected to form a network of processing nodes, the processing functionality of each node being defined by a relational expression in a standard relational language, and streams of message tuples are passed between the plurality of nodes. Further, for two adjacent nodes in the network, node 1 and node 2, the output of the relational expression defining the functionality of node 1 is interpreted as a stream of message tuples by the input of the relational expression defining the functionality of node 2.

Preferably, the means for receiving communicates with a queue manager.

In a preferred embodiment, the sending application is a publisher and the receiving application is a subscriber.

Preferably, the standard relational language is Structured Query Language and a visual database tool is used to generate the relational expression which defines the functionality of a node.

In one embodiment, each message tuple in a stream of message tuples existing between two nodes has the same set of fields. In another embodiment, in a stream of message tuples existing between two nodes, each message tuple in the stream does not necessarily have the same set of fields. Preferably, in the latter embodiment, fields used in a relational expression defining the functionality of a node but which are not defined in a particular message tuple of a stream input to the node are assigned a null value.

In one embodiment, the apparatus is contained on a single data processing unit, while in another embodiment the apparatus is contained on a plurality of interconnected data processing units.

According to a second aspect, the invention provides a method of carrying out the functionality discussed above in the first aspect.

According to a third aspect, the invention provides a computer program product for, when run on a computer, carrying out the functionality discussed above in the first aspect.

According to a fourth aspect, the invention provides a method of providing an information service to a customer, using the message broker data processing apparatus of the first aspect, the method having steps of (a) receiving criteria from a customer concerning which messages the customer wants to receive; (b) receiving published messages from a publisher; (c) comparing the published messages to the criteria received from the customer; and (d) forwarding on to the customer published messages which meet the criteria received from the customer.

Since the invention provides the incoming data to the broker as a stream of message tuples, it becomes easy to collate the incoming data with the database data, as the latter is also organized into tuples. Thus, the data processing element which collates messages in a datastream with data from a database, can be seamlessly integrated into the overall message broker system.

By seamlessly integrating this data processing element with the overall message broker system, the same standard relational methods, such as visual tools, interfaces and models, that are used to program other parts of the broker can also be used while programming the specifics of how a stream of data should be collated (e.g., merged or joined) with data from a database. This greatly facilitates programming the overall broker system, since the same tools can be used throughout.

This ability to use such relational techniques (especially, visual tools) with respect to the complete messaging broker also makes it very easy to optimize any parts of the broker which may have been programmed inefficiently.

Further, the flow of messages through the broker occurs much more efficiently (as compared to the Ambrosia and ActiveWeb prior art) due to the seamless integration into the overall broker system of the unit that collates the incoming data steams with the stored database data.

Lastly, the seamless integration involved in the present invention makes it much easier to treat the processing which takes place within the collation unit as a part of an overall transaction which also takes into account processing which occurs in other parts of the message broker. That is, it is much easier to keep track of system-wide processing aspects, such as transactions, if all of the elements of the broker can be treated alike.

BRIEF DESCRIPTION OF THE DRAWINGS

A preferred embodiment of the present invention will now be described making reference to the following drawing figures.

DETAILED DESCRIPTION OF THE PREFERRED EMBODIMENTS

Figure 1:
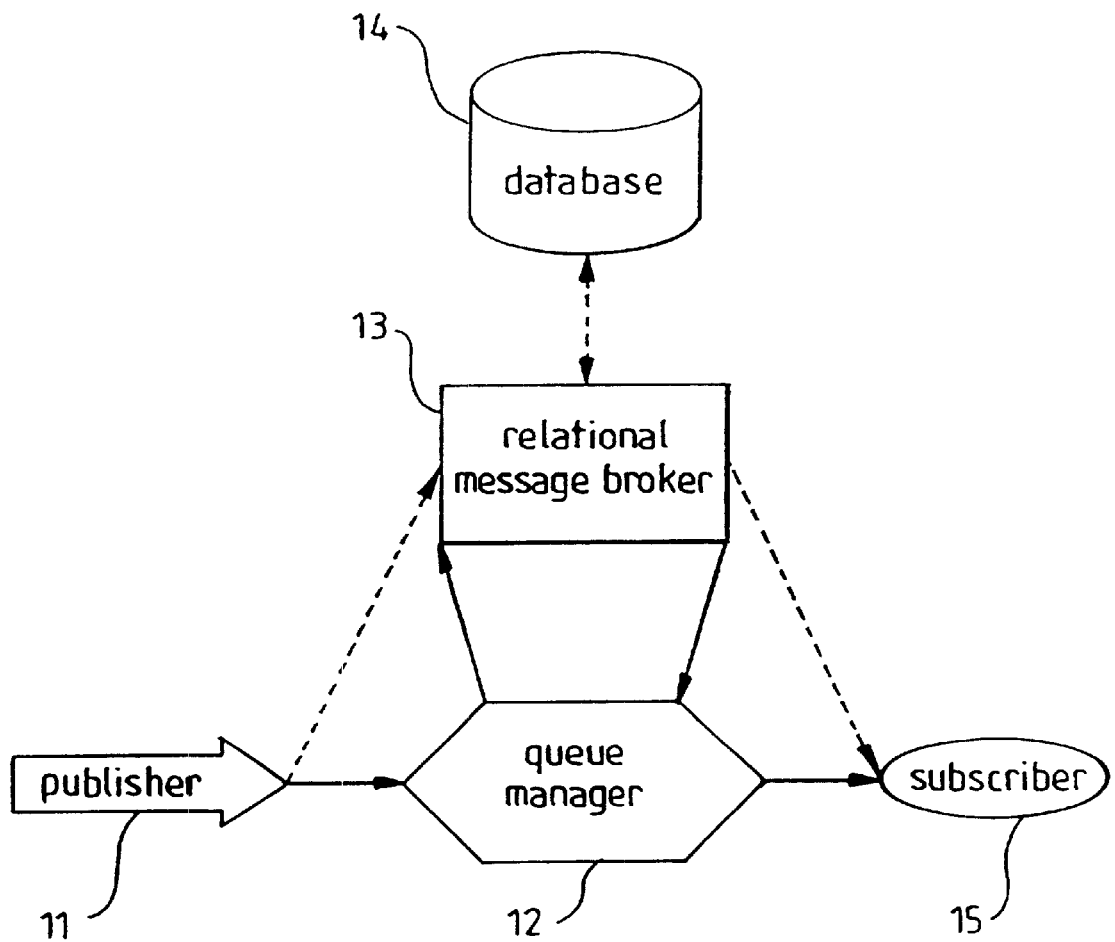
FIG. 1 is a block diagram showing the basic set up of the relational message broker according to a preferred embodiment of the present invention.

In FIG. 1, a publisher data processing unit 11 is provided for supplying live up-to-the-minute data which subscribers would like to receive (stock data will be used in describing the preferred embodiment, as this is a major use of this type of broker, as stock data is a good example of data that is constantly changing and which is required on an immediate basis by many subscribers). Publisher data processing unit 11 can be running on any of a number of available computer processing platforms.

A messaging and queuing unit such as IBM's MQSeries product (shown as queue manager 12) is placed between the publisher data processing unit 11 and a subscriber data processing unit 15. The subscriber data processing unit 15 can be running on any of a number of available computer processing platforms, and the chosen platform can be a different from the platform used by the publisher 11. The known queue manager 12 (such as MQSeries) takes care of all necessary data format translations (e.g., protocols etc.) to allow the publisher 11 and subscriber 15 to communicate with each other in an asynchronous manner (e.g., the subscriber 15 does not have to be operational when messages are being published by the publisher 11, the messages are stored in a queue and the subscriber 15 can retrieve the messages when subscriber 15 is again operational). A separate queue manager 12 is usually assigned to each publisher and subscriber, with the queue managers interacting to control the flow of messages between units, however, for ease of description the queue manager 12 will be described as a single entity.

It should be noted that publisher 11 and subscriber 15 could be running on the same machine. In this latter case, the need for data format conversions is diminished and the queue manager 12 simply routes published messages from publisher application to subscriber application.

The queue manager 12 sends the published messages it receives to a relational message broker 13 (which could be running on an intermediary data processing unit or on a plurality of interconnected data processing units) which processes the messages (as will be described below) and sends them back to the queue manager 12 for placing in the output queues of the appropriate subscribers where they can be retrieved by the subscribers. Only one such subscriber (and publisher) are shown in FIG. 1 for simplicity but the usual case would involve a plurality of subscribers and publishers.

It should be noted that the relational message broker 13 can also be used in a synchronous mode of operation, bypassing the queue manager 12, as shown by the dotted lines in FIG. 1. In fact, the broker 13 can be used in a totally synchronous environment without the provision of a queue manager 12. This would, for example, involve a system where the publisher and subscriber are always operational, thus doing away with the need for the functions of the queue manager 12.

In performing its processing, the broker 13 often accesses a database 14. For example, information in published messages is joined with information stored in the database in order to create a more meaningful message which is then sent to the subscriber. For example, a published message might be that the IBM share price has risen to 150 U.S. dollars per share, and a database record stored in database 14 might indicate that a particular customer having an identifier of C3 owns 77 shares of IBM stock. The join operation performed by the broker 13 would put all of this information together to produce a message longer than the published message which indicates that customer C3 owns 77 shares of IBM stock which is now worth 150 U.S. dollars per share.

As is well known, data stored in a database is organized into rows called "tuples". For example, Table 1 shows three tuples:

TABLE 1

(sample of data stored in database)

| Company | Customer | Quantity |
| --- | --- | --- |
| IBM | C3 | 77 |
| IBM | C2 | 44 |
| Ford | C3 | 120 |

The first tuple indicates that customer C3 owns 77 shares of IBM stock. The second tuple indicates that customer C2 owns 44 shares of IBM stock. The third tuple indicates that customer C3 also owns 120 shares of Ford stock.

According to the preferred embodiment of the present invention, the published messages sent from the publisher 11 are also organized into tuples. A stream of published messages is thus a temporally ordered list of tuples. For example, Table 2 shows a sequence of two messages, each organized into tuples:

TABLE 2

(sample tuples in a message stream)

| Company | Price |
| --- | --- |
| IBM | 160 |
| Ford | 44 |

The first tuple indicates that IBM stock is now worth 160 U.S. dollars per share. The second tuple indicates that Ford stock is now worth 44 U.S. dollars per share.

Each message tuple in a stream can have the same set of fields (e.g., the Company and Price fields). Alternatively, some message tuples in a stream can have a different set of fields with fields which are not defined for a particular message tuple being assigned a NULL value. Further, while the tuples shown in Table 2 have simple data (e.g., a number or a character string), the fields could also contain some further structure, such as an array or a nested tuple.

Figure 2:
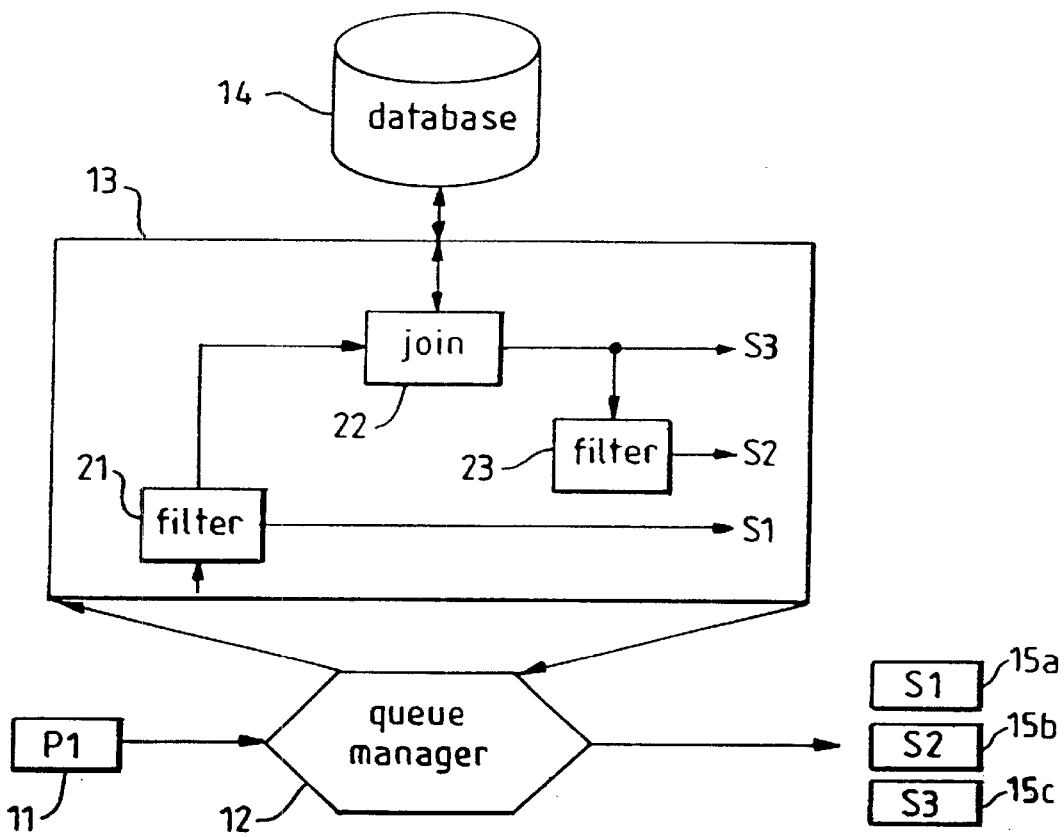
FIG. 2 is a block diagram showing more detail concerning the relational message broker according to a preferred embodiment of the present invention.

Since both the published messages and the database data are arranged as tuples, a desired collation of the published messages and the database data can be specified by using a standard relational expression, as will be apparent from the discussion below of a more detailed block diagram of the relational message broker 13 as shown in FIG. 2 and the plurality of examples which follows.

In FIG. 2, a publisher application P1 (11) sends a stream of published messages which are arranged as tuples to queue manager 12 which forwards the stream on to relational message broker 13 for processing and assignment of messages to particular subscribers, after which the stream of messages is sent back to the queue manager 12 for transmittal to three subscriber applications Si (15a), S2 (15b) and S3 (15c). The relational message broker 13 is arranged as a set of processing nodes 21, 22 and 23 interconnected to form a network. These processing nodes could be all located on the same data processing machine or they may be distributed over a plurality of interconnected data processing machines. The processing functionality of each node is defined by a relational expression in a standard relational language (e.g., an SQL query) as explained more fully below.

Once inside the broker 13, the stream of published messages is first subjected to processing by a filter node 21 which filters out (discards) some of the published messages, only allowing certain messages to pass through the filter. For example, a stream of published stock quotes from P1 will generally involve stock quotes from a very large number of companies. Perhaps the subscribers S1, S2 and S3 are only interested in stocks from IBM and Ford. Thus, the filter node 21 only allows messages to pass through the filter if the messages concern share prices for either IBM or Ford. The functionality of the filter node 21 is very well known in the relational database art, as this is a very common relational database operation (usually referred to as "select"). The processing functionality of the filter node 21 is defined by a relational expression using, for example, the SQL SELECT statement, to express exactly which messages will be allowed to pass through the filter.

The output of the filter 21 is connected to the input of a join operator 22 which takes the filtered message stream (which involves only IBM and Ford stock quotes) as a first input. The join node 22 receives a second input from database 14. When the join node 22 receives published messages from the output of filter node 21, appropriate database tuples are accessed and read out of the database 14 for joining with the published messages. The functionality of the join node 22 is very well known in the relational database art, as this is a very common relational database operation. The processing functionality of the join node 22 is defined by a relational expression using, for example, the SQL INNER JOIN statement, to express exactly how the message stream is joined with the database data.

For example, using the database data of Table 1, when a first published message tuple (shown in the first line of Table 2), which states that the IBM share price is now 160 U.S. dollars per share is received by the broker 13, it passes through the filter node 21, since the relational expression defining this node allows message tuples to pass if they involve IBM or Ford share prices. When this message tuple reaches the join node 22, the join node performs a collation of this message tuple and the tuple shown in the first line of Table 1 to provide a longer tuple as shown in the first line of Table 3 (which indicates that customer C3 has 77 shares of IBM stock that is currently worth 160 U.S. dollars per share).

TABLE 3

(sample tuples in a message stream at the output of join node)

| Company | Price | Customer | Quantity |
| --- | --- | --- | --- |
| IBM | 160 | C3 | 77 |
| IBM | 160 | C2 | 44 |
| Ford | 44 | C3 | 120 |

The output of this join node 22 is then sent to the queue manager 12 for inclusion in S3's queue. Subscriber S3 (15c) then retrieves the messages from the queue whenever the subscriber S3 is ready to retrieve information. According to the node structure of FIG. 2, S3 will receive messages concerning all customers that own IBM or Ford stock. S3 is, for example, an auditor who wishes to obtain stock ownership data concerning all customers.

This same message tuple (shown in the first line of Table 2) will also be joined at the join node 22 with the database tuple shown in the second line of Table 1, resulting in a longer tuple as shown in the second line of Table 3 (which indicates that customer C2 has 44 shares of IBM stock that is currently worth 160 U.S. dollars per share). The output of this join node 22 is then sent to the queue manager 12 for inclusion in S3's queue. Subscriber S3 (15c) then retrieves the messages from the queue whenever the subscriber S3 is ready to retrieve information.

The output of join node 22 is also sent to queue manager 12 for inclusion in S2's queue. Specifically, the output of the join node 22 is sent to a filter node 23 which has been programmed to pass through only message tuples that relate to customer C2. The processing functionality of the filter node 23 is defined by a relational expression using, for example, the SQL SELECT statement to express exactly which messages will be allowed to pass through the filter. The message tuple shown in the second line of Table 3 does relate to C2 and thus will pass through the filter node 23 to be sent to queue manager 12 for inclusion in S2's queue. Subscriber S2 (15b) then retrieves the messages from the queue whenever the subscriber S2 is ready to retrieve information.

When a second published message tuple (as shown in the second line of Table 2) reaches the filter node 21, it will be allowed to pass through the filter node 21 since the message tuple relates to Ford share prices (specifically, this message tuple states that the current Ford share price is now 44 U.S. dollars per share). Once through the filter node 21, this message tuple makes its way to the join node 22, where it is joined with the database tuple shown in the third line of Table 1 (since this is the only database tuple that involves Ford) to provide a longer tuple as shown in the third line of Table 3 (which indicates that customer C3 has 120 shares of Ford stock that is currently worth 44 U.S. dollars per share). This message tuple output from this join node 22 is then sent to the queue manager 12 for inclusion in S3's queue. Subscriber S3 (15c) then retrieves the messages from the queue whenever the subscriber S3 is ready to retrieve information. This message tuple output from join node 22 (which involves customer C3) is not allowed to pass through filter node 23, since filter node 23 only allows message tuples to pass if they involve customer C2.

Assume that subscriber Si is very interested in IBM and Ford stock but has not bought any shares in either company and does not plan on buying any. For example, assume S1 is a financial agent that makes business decisions based on the current share price of IBM and Ford stock. In this case, there is no need to involve the join node 22 since the database 14 does not contain any information that is desirable to S1. Thus, a second output is provided to filter node 21 and all published message tuples which the filter node 21 allows to pass (stock prices concerning IBM and Ford share prices) are output from this second output. The messages are then passed to the queue manager 12 for inclusion in S1's queue. Subscriber S1 (15a) then retrieves the messages from the queue whenever the subscriber S1 is ready to retrieve information.

Thus, the functionality of each node of the broker 13 is defined entirely in database-specific terms. Each node has a relational expression expressed in a standard relational language, such as SQL. The output of the relational expression of one node is a steam of message tuples which is provided as an input to a relational expression of an adjacent node. The filter nodes 21 and 23 use the common SELECT function of database relational algebra. The join node 22 uses the common INNER JOIN function of database relational algebra. While the collation that takes place between the database 14 and the published messages has been described in detail as the "join" operation, many other relational algebraic operations can also be implemented in order to collate the database data with the published messages, such as the "intersection", "compute" or "union" operations.

Some examples of relational expressions that could be used to define the functionality of nodes will now be given.

EXAMPLE 1

Filtering

The first filter node (21) of the example is defined in SQL by

SELECT *
FROM Stock
WHERE Company="IBM" OR Company="Ford"

EXAMPLE 2

Join

Assume that the output stream from node 21 is named Q21, and the database relation of customer holding information is named Holding. The join node (22) is then defined by SELECT Q21.*, Customer, Quantity
FROM Q21 INNER JOIN Holding
ON Q21.Company=Holding.Company

EXAMPLE 3

Join dependent Filtering

If the output stream of the join node is Q22, the filter of node 23, which depends on the customer field output from the join, is expressed as SELECT *
FROM Q22
WHERE Customer="C2"

EXAMPLE 4

Computation

The total value for each transaction may be computed by

SELECT *, Price*Quantity AS TotalValue
FROM Q22

EXAMPLE 5

Negative Filtering (Difference)

The subscriber does not want to see stock information about companies where the local policy proscribes trading in their shares. A list of such companies is held in the Proscribed relation of the database. A subscription is made on the SQL definition:

SELECT *
FROM Stock
WHERE Company NOT IN
(SELECT Company FROM Proscribed)

EXAMPLE 6

Archive

The administrator sets up a datestamped archive by inserting the message tuples of the input stream Stock into a relation.

INSERT INTO StockArchive
SELECT *, Time() as TimeAudit
FROM Stock

EXAMPLE 7

Update

The administrator wants to keep track of the latest price for each company in the database table StockLatest.

UPDATE StockLatest INNER JOIN Stock
ON StockLatest.Company=Stock.Company
SET StockLatest.Price=Stock.price,
    StockLatest.LogTime=Now();

EXAMPLE 8

Compound Expression

SQL permits the combination of several computations into a single expression. The following expression combines join, filter and computation.

SELECT Q21.*, Customer, Quantity, Price*Quantity as TotalValue
FROM Q21 INNER JOIN Holding
ON Q21.Company=Holding.Company
WHERE Customer='C2'

Figure 3:
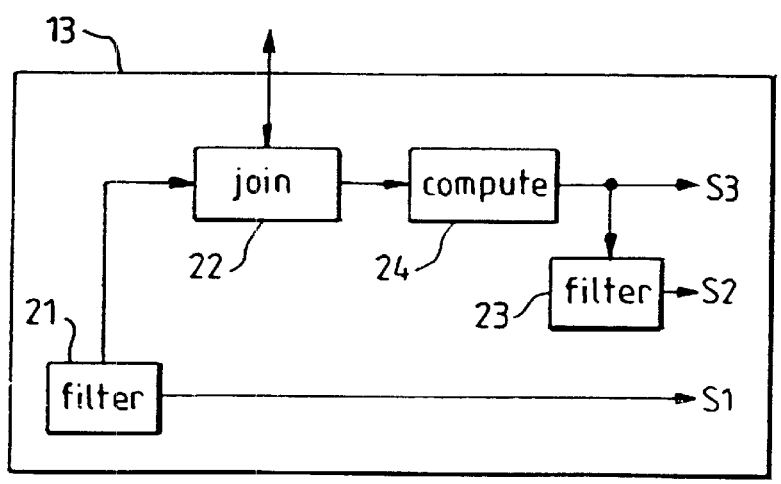
FIG. 3 is a block diagram showing a modified version of the relational message broker of FIG. 2.

Once the broker system has been designed, it is very easy to make changes to add additional functionality. For example, a compute node 24 (as shown in FIG. 3) could be added at the output of the join node 22 so that the resultant message would include another field that is the total current value of each customer's share ownership in the relevant company. That is, the compute node 24 would multiply the share price by the number of shares a customer has and provide the product in a separate field (called "Total Value"). Thus, Table 3 would now become:

TABLE 4

| Company | Price | Customer | Quantity | Total Value |
|---------|-------|----------|----------|-------------|
| IBM     | 160   | C3       | 77       | 12,320      |
| IBM     | 160   | C2       | 44       | 7,040       |
| Ford    | 44    | C3       | 120      | 5,280       |

Also, changes to existing nodes (e.g., 22) can be easily made by modifying the relational expression which defines the functionality of the node. Since the join node 22 and the filter nodes 21 and 23 are all seamlessly integrated into a network of interconnected nodes with streams of message tuples being passed between the nodes, the relational expressions of any of the nodes can be easily modified in a uniform fashion. There is no need to have to switch to a different type of programming for any of the nodes (as was the case in the prior art discussed above).

Since the functionality of the broker is implemented in database specific terms, it becomes very easy to make changes to the functional units of the broker 13 using standard visual tools that are available for programming relational database management systems. For example, Microsoft's Access product provides such a visual tool. Relational database programmers are already familiar with these tools. Thus, database programmers will find it easy to set up the structure of the nodes (e.g., 21, 22, 23) of the broker 13. For example, if, due to a customer request, a change must be made to a join node, this can easily be carried out by the database programmer without having to learn a new programming technique, thus greatly reducing the system development expense.

While each of the nodes are defined by relational expressions in the preferred embodiment, some of the nodes may be implemented in other ways, but of course the benefits of the invention are reduced in such a case.

A value-added publish/subscribe application of the relational message broker of the preferred embodiment of the present invention has been described, as this is a very useful environment for the invention. However, there are many other environments where the invention would be useful, including workflow streams, where a transmitted message can be directed to any of a plurality of receivers depending on which receiver is not busy at that time. In the workflow environment, the broker would access the database 14 in order to determine data concerning each receiver in order to make a decision concerning which receiver should be assigned a work request message.

One embodiment of the invention provides the relational message broker functionality on a server computer connected to the Internet so that publisher and subscriber applications can access the Internet server as clients via World Wide Web browser applications. In this way, the broker 13 will push published messages over the Internet to subscriber 15's web browser application when such published messages match the criteria which the subscriber has earlier prescribed (again by using the web browser application to contact the Internet server).

I claim:

1. A message broker data processing apparatus for use in receiving messages from a sender application, processing the received messages and deciding which receiver application to forward the processed messages, comprising:

means for receiving an incoming stream of messages from a sender application, with each message being arranged as a tuple having at least one field;

means for collating the incoming stream of messages with database data stored in a database, the database data being also arranged as tuples having at least one field; and means for processing the stream of messages so that a resultant stream of messages becomes directed to at least one receiving application.

2. The apparatus of claim 1 wherein the means for receiving, means for collating and means for processing utilize a plurality of processing nodes interconnected to form a network of processing nodes, the processing functionality of each node being defined by a relational expression in a standard relational language.

3. The apparatus of claim 2 wherein streams of message tuples are passed between the plurality of nodes.

4. The apparatus of claim 3 wherein, for two adjacent nodes in the network, node 1 and node 2, the output of the relational expression defining the functionality of node 1 is interpreted as a stream of message tuples by the input of the relational expression defining the functionality of node 2.

5. The apparatus of claim 1 wherein the means for receiving communicates with a queue manager.

6. The apparatus of claim 1 wherein the sending application is a publisher and the receiving application is a subscriber.

7. The apparatus of claim 2 wherein the standard relational language is Structured Query Language.

8. The apparatus of claim 2 wherein a visual database tool is used to generate the relational expression which defines the functionality of a node.

9. The apparatus of claim 3 wherein each message tuple in a stream of message tuples existing between two nodes has the same set of fields.

10. The apparatus of claim 3 wherein, in a stream of message tuples existing between two nodes, each message tuple in the stream does not necessarily have the same set of fields.

11. The apparatus of claim 10 wherein fields used in a relational expression defining the functionality of a node but which are not defined in a particular message tuple of a stream input to the node are assigned a null value.

12. The apparatus of claim 1 wherein said apparatus is contained on a single data processing unit.

13. The apparatus of claim 1 wherein said apparatus is contained on a plurality of interconnected data processing units.

14. A method of providing an information service to a customer, using the apparatus of claim 1, comprising steps of:

(a) receiving criteria from a customer concerning which messages the customer wants to receive;

(b) receiving published messages from a publisher;

(c) comparing the published messages to the criteria received from the customer; and (d) forwarding on to the customer published messages which meet the criteria received from the customer.

15. A message broker data processing method for use in receiving messages from a sender application, processing the received messages and deciding which receiver application to forward the processed messages, comprising steps of:

receiving an incoming stream of messages from a sender application, with each message being arranged as a tuple having at least one field;

collating the incoming stream of messages with database data stored in a database, the database data being also arranged as tuples having at least one field; and processing the stream of messages so that a resultant stream of messages becomes directed to at least one receiving application.

16. The method of claim 15 wherein the steps of receiving, collating and processing utilize a plurality of processing nodes interconnected to form a network of processing nodes, the processing functionality of each node being defined by a relational expression in a standard relational language.

17. The method of claim 16 wherein streams of message tuples are passed between the plurality of nodes.

18. The method of claim 17 wherein, for two adjacent nodes in the network, node 1 and node 2, the output of the relational expression defining the functionality of node 1 is interpreted as a stream of message tuples by the input of the relational expression defining the functionality of node 2.

19. The method of claim 15 wherein the step of receiving communicates with a queue manager.

20. The method of claim 15 wherein the sending application is a publisher and the receiving application is a subscriber.

21. The method of claim 16 wherein the standard relational language is Structured Query Language.

22. The method of claim 16 wherein a visual database tool is used to generate the relational expression which defines the functionality of a node.

23. The method of claim 17 wherein each message tuple in a stream of message tuples existing between two nodes has the same set of fields.

24. The method of claim 17 wherein, in a stream of message tuples existing between two nodes, each message tuple in the stream does not necessarily have the same set of fields.

25. The method of claim 24 wherein fields used in a relational expression defining the functionality of a node but which are not defined in a particular message tuple of a stream input to the node are assigned a null value.

26. A computer program product stored on a computer readable storage medium for, when run on a data processing apparatus, carrying out a message broker data processing method for use in receiving messages from a sender application, processing the received messages and deciding which receiver application to forward the processed messages, comprising steps of:

receiving an incoming stream of messages from a sender application, with each message being arranged as a tuple having at least one field;

collating the incoming stream of messages with database data stored in a database, the database data being also arranged as tuples having at least one field; and processing the stream of messages so that a resultant stream of messages becomes directed to at least one receiving application.

27. The product of claim 26 wherein the steps of receiving, collating and processing utilize a plurality of processing nodes interconnected to form a network of processing nodes, the processing functionality of each node being defined by a relational expression in a standard relational language.

28. The product of claim 27 wherein streams of message tuples are passed between the plurality of nodes.

29. The product of claim 28 wherein, for two adjacent nodes in the network, node 1 and node 2, the output of the relational expression defining the functionality of node 1 is interpreted as a stream of message tuples by the input of the relational expression defining the functionality of node 2.

30. The product of claim 26 wherein the step of receiving communicates with a queue manager.

31. The product of claim 26 wherein the sending application is a publisher and the receiving application is a subscriber.

32. The product of claim 27 wherein the standard relational language is Structured Query Language.

33. The product of claim 27 wherein a visual database tool is used to generate the relational expression which defines the functionality of a node.

34. The product of claim 28 wherein each message tuple in a stream of message tuples existing between two nodes has the same set of fields.

35. The product of claim 28 wherein, in a stream of message tuples existing between two nodes, each message tuple in the stream does not necessarily have the same set of fields.

36. The product of claim 35 wherein fields used in a relational expression defining the functionality of a node but which are not defined in a particular message tuple of a stream input to the node are assigned a null value.

37. The apparatus of claim 1 wherein the message broker data processing apparatus is located on an Internet server and at least one of the sending application and receiving application utilize a World Wide Web browser application.

38. The method of claim 15 wherein the message broker data processing apparatus is located on an Internet server and at least one of the sending application and receiving application utilize a World Wide Web browser application.

39. The product of claim 26 wherein the message broker data processing apparatus is located on an Internet server and at least one of the sending application and receiving application utilize a World Wide Web browser application.

* * * * *